No. 805,407. PATENTED NOV. 21, 1905.
A. BORN.
PROCESS FOR CLEANSING, SCOURING, OR REMOVING OIL AND FAT FROM WOOL, HAIR, BRISTLES, OR OTHER MATERIAL.
APPLICATION FILED JAN. 27, 1902.
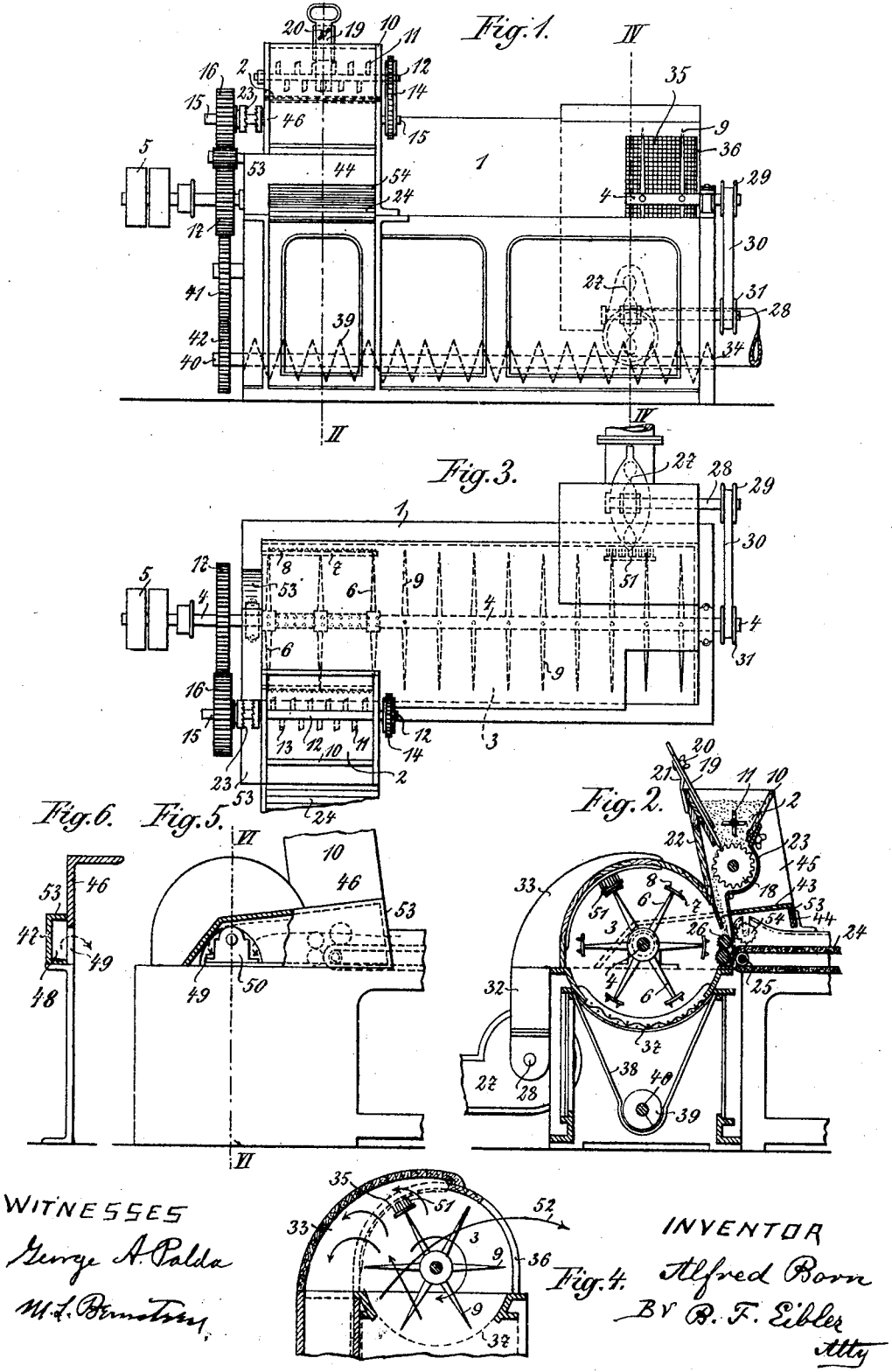
WITNESSES
George A. Palda
M. L. Bernstein
INVENTOR
Alfred Born
By B. F. Eibler
Atty

UNITED STATES PATENT OFFICE.

ALFRED BORN, OF BERLIN, GERMANY.

PROCESS FOR CLEANSING, SCOURING, OR REMOVING OIL AND FAT FROM WOOL, HAIR, BRISTLES, AND OTHER MATERIAL.

No. 805,407.       Specification of Letters Patent.       Patented Nov. 21, 1905.

Application filed January 27, 1902. Serial No. 91,461.

*To all whom it may concern:*

Be it known that I, ALFRED BORN, of Berlin, in the German Empire, have invented an Improved Process for Cleansing, Scouring, or Removing Oil and Fat from Wool, Hair, Bristles, and other Material, of which the following is a specification.

The washing of wool—that is to say, the freeing thereof from fat, sweat, and dirt—has from time immemorial been effected with lye. In spite of the remoteness of its origin and general adoption, however, the treatment with lye has very considerable disadvantages. If in consequence of the use of too weak a lye the fat is not entirely removed from the wool, the latter takes the dye badly and yields a harsh hard product in manufacture. If, on the other hand, too strong a lye is used in order to entirely remove the fat, the wool becomes hard and brittle. To find the proper mean, particularly for fresh wool, is often very difficult even to a skilled wool-washer, so that mistakes in one or the other direction are not rare. These mistakes are usually irreparable and affect the whole of the manufacturing process. Besides this the lye eats away part of the substance of the wool, in fact a very considerably higher percentage thereof than experts formerly believed. In view of the importance of the woolen industry frequent attempts have already been made to remove the disadvantages connected with the washing of wool with lye; but these attempts have hitherto not been attended with satisfactory results. Most of the attempts referred to have dealt with chemical treatment; but for about the last fifteen years endeavors have been made to utilize the well-known property of certain earths (absorbent earths) of absorbing fat for removing the fat from raw wool, these earths having been used for removing the fat from waste wool. Absorbent earths of this kind, the absorptive properties of which are due to porosity or capillarity, are, for instance, fossil meal, alumina, chalk, and the like. The method adopted of using these earths was in itself not wrong, but did not give the result desired, for the reason that the means employed were unsuitable and did not allow the earth to take sufficient effect.

As the result of experiment extending over years the present invention solves the ancient and difficult problem of removing the fat from and cleansing wool without injuring the fiber by the use of absorbent earths. For the cleansing of wool by means of absorbent earths it is necessary that the wool fiber and the absorbent earth should, above all, be intimately and absolutely uniformly mixed together until the fat and sweat have been uniformly and sufficiently removed. A mixture with uniform effect is, for instance, obtained if the wool is kneaded with wet or moist absorbent earth. This method of removing the fat, which, as is known, has been employed for a long time with waste wool, removed the fat uniformly and sufficiently; but it also deteriorates the quality of the wool. The uniform treatment of wool with dry absorbent earth is only possible by, so to say, "powdering" the latter into the wool. Observation shows that dust deposits itself on the surface of bodies with a certain degree of evenness in a similar manner to moisture. Only the actual powdering of the wool fibers with absorbent earth insures the uniform covering of the fibers with the absorbent particles, and therefore the uniform removal of fat from the fibers. The effective powdering of the wool with absorbent earth by purely mechanical means is impossible without considerably damaging the wool fiber. The natural vehicle of dust, the air, must be called to aid for the purpose. This is done most effectively by passing the wool and the absorbent earth through a kind of deviling-machine in which a powerful current or eddy of air is produced by means of an exhauster, ventilator, or the like, or both combined. The circulating dust-laden air continuously deposits the absorbent powder on the fibers of wool while the wool is being rapidly whirled round by the beaters in the form of separate flocks, tufts, and fibers, and the powder uniformly draws the fat, sweat, and moisture out of the fibers. Even the foreign bodies in the wool (dirt, burs, and the like) are so thoroughly dried during this process that when the dry wool is beaten they may fall off together with the saturated absorbent earth. Above the feeding-band of the deviling or beating machine, which may be of the form as hitherto employed for the loosening of wool and the freeing of the same from dust, a holder for the reception of the powdered absorptive substance is arranged, its bottom being formed by a distributing-roller. By means of a suitable device the outlet of the powdered substance can be regulated according to requirements. By means of the air-current or eddy of air produced by the exhauster through the machine the absorptive material entering with the wool or other material over the feeding-band into the machine is finally distributed, so that it covers the loosened fibers which are whirled round by the beaters. During the passage of the woolen fibers or other material through the machine the fibers are alternately uniformly covered with dust and then freed from the same. The dust on settling on the fibers absorbs fat and the like from the same until it is beaten off, when fresh dust takes its place, the above-mentioned operations being repeated. The particles of dust laden with fat, moisture, and other impurities when beaten off the fibers sink below and leave the machine, while the lighter dust held in suspension takes their place and covers the fibers again.

It is to be especially noted that according to this process each of the fibers is not merely once covered with the dust, which is subsequently removed, whereupon the process, as far as this fiber is concerned, is complete, but that each fiber is subjected to the process of being covered with dust and being freed from the same an indefinite number of times.

The circulating air not only acts as a powdering agent, but absorbs moisture itself. The latter effect can be increased by the use of heated air.

The complete removal of the powder from the wool is either effected with the latter dry in a beating-machine or by means of water. The latter method is preferable, since by suitable wet after treatment not only dust is completely removed, but also any remainder of dirt which may be present, and the wool is given a degree of flexibility and whiteness never obtained by treatment with lye.

This process is not only applicable to wool, waste wool, and other textile material, but also to hair, feathers, bristles, and all other material containing fat—as, for instance, yarn and fabrics, which can be powdered by means of moving or agitated air in such a manner that they can be sucked completely dry from their surfaces.

An apparatus which is adapted to carry out the present process is illustrated by way of illustration in the annexed drawings and preferably consists of a beating-machine provided with means for introducing wool, hair, or other material to be cleansed and with means for introducing absorbent earth—for instance, fossil meal, alumina, chalk, and the like—and an exhauster or ventilator.

In said drawings, Figure 1 is a front elevation of a machine adapted to carry out the present process. Fig. 2 is a section on the line II II, Fig. 1, the lateral portion of the hood 53 being indicated in dotted lines to indicate its position with regard to other parts of the apparatus. Fig. 3 is a plan view of the apparatus shown in Fig. 1. Fig. 4 is a section on the line IV IV of Fig. 1, showing the exit-openings for the wool and the absorbent material. Fig. 5 is a part-sectional end elevation of the left hand of the machine, as shown in Fig. 1, the gearing for operating the machine being removed. Fig. 6 is a section on the line VI VI of Fig. 5 of the hood 53 and a portion of the frame of the machine.

The main parts of the apparatus consist of the beating-machine 1, means 2 for spreading the absorbent earth, and the exhauster or ventilator 27. The beating-machine consists of the cylindrical beating-chamber 3, through which passes the longitudinal shaft 4, adapted to be driven from the belt-pulleys 5. The left-hand portion of the shaft, as seen in Fig. 3, is fitted with radial arms 6, to which are attached the bars 7, which are provided with spikes 8 or the like, said bars 7 being parallel to the shaft 4. The other portion of the shaft is provided with radial beaters 9, which may be arranged helically around the shaft in such a manner as to cause the wool or other material when fed into one end of the chamber to be carried through the chamber and passed out at the opposite end.

The mechanism for spreading the absorbent earth consists of the feed-hopper 10, within which is located an agitator 11, which serves to maintain the material from "caking," &c. Said agitator, which consists of a shaft 12 on which fingers 13 are fixed, is operated suitably by the chain-wheel gearing 14, driven from the shaft 15, said shaft being operated from the shaft 4 by means of the toothed wheels 16 17. At the bottom of the open end of the hopper a distributing-roller 18 is arranged, said roller suitably having a corrugated or fluted surface. The opening between the left-hand lower end of the hopper, as shown in Fig. 2, and said distributing-roller is adapted to be controlled by the slide 19, the position of which can be adjusted by the thumb-screw 20, mounted on the slide-holder 21. The back board 22 and the front casing 23 serve to inclose the distributing-roller 18 and to form a passage down which the absorbent material passes. The distributing-roller 18 is mounted on the shaft 15, which, as above stated, is adapted to be driven from the shaft 4, a clutch 23 being arranged for the sake of putting the roller 18 and the agitator 11 in and out of gear.

24 is an endless traveling band for introducing the wool or other material to be cleansed into the beating-chamber 3, said band passing round the roller 25, Fig. 2, arranged in proximity to the opening into the chamber 3. A feed-roll is located above said band and is adapted to regulate the amount of wool or other material to be passed into the beating-chamber.

The feed-rolls 26 are arranged close to the end of the band 24 and under the end of the passage formed by the back board 22 and the casing 23. The exhauster 27 is mounted on a shaft 28, which is driven from the shaft 4 by means of the pulley 29, the belt 30, and the pulley 31, said exhauster being connected on the one side with the beating-chamber 3 through the pipe 32 and the hood 33, which communicates, as shown in Fig. 4, with the chamber 3. The exhauster 27 is on its other side connected with the pipe 34, by which the exhaust air and dust carried by the same can be led to any suitable dust-catcher, which may be of any of the constructions known in connection with the milling industry or elsewhere. The opening between the hood 33 and the beating-chamber 3 is provided with a fine sieve 35. Opposite said sieve the casing of the beating-machine 1 is provided with an opening 36. The bottom of the casing of the beating-machine consists of a sieve 37, Fig. 2, having a fairly wide mesh. A hopper-shaped casing 38 is provided underneath said sieve, the bottom of said hopper-shaped casing forming a trough in which a screw conveyer 39 is arranged, the shaft 40 of said screw conveyer being adapted to be driven from the shaft 4 through the toothed wheels 17, 41, and 42.

The machine is provided with a dust-hood 53, the arrangement of which can be seen from Figs. 1, 2, 5, and 6. As shown in Fig. 2, one portion 43 of the hood is substantially horizontal and projects over the end of the band 24, the extreme forward end of said portion 43 being provided with a substantially vertical portion 44, the lower edge of which is sufficiently high to allow the wool carried on the band to pass underneath. The right-hand edges of said portions 43 and 44 are attached to the lateral board 45. The portion 44, as is clear from Fig. 1, extends to the left beyond the side board 46 and extends downward at the side of the band 24. As shown in Figs. 5 and 6, the hood is extended along the end of the machine by means of the portion 47, (shown in section in Fig. 6,) between which and the side board 46 a passage 48 is formed, which communicates with the beating-chamber 3 through the hole 49, formed in said side board in proximity to the bearing 50 of the shaft 4. Toward the front of the machine the side board 46 does not extend below the level of the portion 43, and consequently the whole arrangement of the hood 53 forms a front chamber under the portion 43 and a lateral passage leading into the beating-chamber 3 through the opening in proximity to the bearing 50.

The operation of the machine is as follows: The exhauster 27 produces a strong current of air through the chamber 3, the bulk of the air entering through the opening 49, Fig. 5. The rotary motion of the beaters and of the wool carried thereby tends to put the air in the chamber 3 into a state of rotation, the result of the simultaneous action of the exhauster 27 and of the beaters being that the air passes through the chamber 3 in the form of a helical current or an elongated eddy. The wool carried by the band 24 passes under the roller 25 and between the feed-rolls 26 into the machine, the supply of absorbent material falling upon it just before passing through the feed-rolls. The supply of absorbent material can be regulated by adjusting the slide 19. The feed-rolls 26 allow only a determined quantity of absorbent material with the wool to pass into the machine and push the excess backward. This excess dust is caught up by the strong current of air and is carried therewith into the machine, entering into the beating-chamber through the opening 49. Apart from the fact that this method of introducing dust into the beating-chamber is of great service, though not of essential importance, in the operation of the machine, the removal of all the dust-laden air in the neighorhood of the meeting-place of the dust-supply and the wool is of great importance from the point of view of the operator, who would otherwise be in danger on account of the dust escaping from the machine into the room. The wool, covered with a layer of dust, on entering into the chamber 3 is seized by the spiked bars 7 and whirled round in the previously-mentioned helical current of dust-laden air. The individual fibers of the wool are consequently repeatedly first covered with dust and then freed from the same by the beating action of the beaters. The dust while covering the fiber removes fat, sweat, and moisture from the same, and on being beaten off the fiber is again exposed to the action of fresh absorbent material which continues the cleansing operation. Each fiber is consequently covered with dust an indefinite number of times and freed from the same, the resultant effect being that the fat and the like are removed from the wool in an exceedingly perfect manner. The powdered absorbent material on becoming saturated falls through the sieve 37 into the trough-shaped channel at the bottom of the hopper-shaped casing 38 and is conveyed out of the machine by means of the screw conveyer 39. The finer dust carried by the air passes through the sieve 35, into the hood 33, through the exhauster 27, and into the pipe 34. In order to prevent the latter sieve from becoming clogged by the greasy saturated earth, a brush or fan 51, Figs. 2, 3, and 4, is fixed on the beaters 9 and cleans the sieve each time it rotates, it not being necessary for the brush or fan to make direct contact with the sieve, as the current of air produced by the brush is sufficient for the object in view. It may be remarked that not only does the dust serve to remove moisture from the wool, but the air itself also produces the same effect, the air being heated, if desired. The wool passes out of the machine, as indicated by the arrow 52, Fig. 4, through the opening 36.

It is to be understood that the description of the apparatus is merely given to explain one embodiment of an apparatus by which the process may be carried into effect.

What I claim is—

Process for scouring, cleansing and removing fat from wool, hair, bristles and other materials, consisting in mechanically whirling and beating the material in the form of separate flocks, tufts and fibers in a current of air laden with powdered absorbent material, substantially as described and for the purpose set forth.

In testimony that I claim the foregoing as my invention I have signed my name, this 7th day of December, 1901, in presence of two subscribing witnesses.

ALFRED BORN.

Witnesses:
    HENRY HASPER,
    WOLDEMAR HAUPT.